(12) United States Patent
Gabbard

(10) Patent No.: US 6,392,531 B1
(45) Date of Patent: May 21, 2002

(54) VEHICLE DISABLING SYSTEM EMPLOYING GLOBAL POSITIONING SATELLITE

(76) Inventor: Charles H. Gabbard, P. O. Box 7952, Newport Beach, CA (US) 92658

(*) Notice: Subject to any disclaimer, the term of this patent is extended or adjusted under 35 U.S.C. 154(b) by 0 days.

(21) Appl. No.: 09/636,207

(22) Filed: Aug. 10, 2000

Related U.S. Application Data

(63) Continuation-in-part of application No. 09/517,892, filed on Mar. 3, 2000, which is a continuation-in-part of application No. 09/159,438, filed on Sep. 24, 1998, now Pat. No. 6,124,805, which is a continuation-in-part of application No. 09/081,473, filed on May 19, 1998, now Pat. No. 6,232,884.

(51) Int. Cl.[7] .............................. H04Q 5/22; G06F 7/04
(52) U.S. Cl. ..................... 340/5.31; 340/426; 340/10.1; 307/10.2; 180/287; 701/36
(58) Field of Search ............................. 340/5.31, 425.5, 340/426, 463; 701/36; 307/10.2; 180/287

(56) References Cited

U.S. PATENT DOCUMENTS

| | | | |
|---|---|---|---|
| 4,001,822 A | 1/1977 | Sterzer | |
| 4,660,528 A | 4/1987 | Buck | |
| 4,878,050 A | 10/1989 | Kelley | |
| 5,008,661 A | 4/1991 | Raj | |
| 5,293,527 A | 3/1994 | Sutton et al. | |
| 5,533,589 A | 7/1996 | Critzer | |
| 5,588,038 A | * 12/1996 | Snyder | ........................ 340/993 |

OTHER PUBLICATIONS

Laser Technology Inc., Beyond a Shadow of a Doubt, LTI 20–20, four pages No Page Numbers.

* cited by examiner

*Primary Examiner*—Timothy Edwards, Jr.
(74) *Attorney, Agent, or Firm*—Stetina Brunda Garred & Brucker

(57) ABSTRACT

A vehicle disabling system for terminating operation of a vehicle. The system first includes a transmit unit in communication with a global positioning satellite for conveying a command shutdown message via the satellite to a target vehicle. Second, the system includes a command-receiver vehicle unit in two-way communication with the transmit unit via the global positioning satellite such that a shutdown message from the transmit unit can reach the vehicle unit. The vehicle unit is in communication with at least one operational component of the vehicle and capable of shutting down that component upon receipt of a shutdown message from the transmit unit to thereby terminate vehicle operation.

10 Claims, 1 Drawing Sheet

VEHICLE DISABLING SYSTEM EMPLOYING GLOBAL POSITIONING SATELLITE

RELATED APPLICATIONS

This application is a continuation-in-part application of co-pending U.S. patent application Ser. No. 09/517,892, filed Mar. 3, 2000, which is a continuation-in-part application of U.S. patent application Ser. No. 09/159,438, filed Sep. 24, 1998, issued on Sep. 26, 2000 as U.S. Pat. No. 6,124,805, which is a continuation-in-part application of U.S. patent application Ser. No. 09/081,473, filed May 19, 1998, issued on U.S. Pat. No. 6,232,884B1 on May 15, 2001.

STATEMENT REGARDING FEDERALLY SPONSORED RESEARCH OR DEVELOPMENT (Not Applicable)

BACKGROUND OF THE INVENTION

This invention relates in general to vehicle security, and in particular to a vehicle disabling system where a command generator conveys a command shutdown message via a global positioning satellite to a target vehicle with a receiver capable of terminating vehicle operation and situated within a vehicle to be so disabled.

The use of stolen vehicles in committing crimes and in escaping capture by law enforcement officials represents a major criminal activity in both urban and rural communities. Criminals may use stolen vehicles in the commission of bank, jewelry and retail store robberies, fleeing from arrest or re-arrest after an escape, a hit-and-run accident, and other illegal actions. When such an event occurs and identity of the stolen vehicle is known, police officers who spot the vehicle will give chase to hopefully apprehend the driver and any accompanying passengers. Current statistics show that there are approximately 27,000 vehicle chases in the United States everyday. Unfortunately, such police chases can result in tragic endings when innocent third parties are involved in collisions, shootings, or the like during the chase procedure.

As is expected, the longer a chase takes, the greater are the chances that non-involved parties will become victims of the pursuit. As a result, law enforcement officials may need to terminate chase efforts because of danger to third parties and thus permit criminals to escape apprehension. When such termination is not a viable choice, however, risks continue to accrue until the course of the chase is resolved. In view of the danger and potential injury to innocent third parties because of police chases, it is evident that a need is present for technology that can allow police personnel to apprehend such fleeing criminals without lengthy pursuits. Accordingly, a primary object of the present invention is to provide a vehicle disabling system for terminating operation of a vehicle upon transmission of a command.

Another object of the present invention is to provide such a disabling system whereby the vehicle has a command receiver in communication with equipment capable of shutting down engine operation.

Yet another object of the present invention is to provide such a disabling system wherein fuel flow or electrical power to the vehicle engine is terminated to thereby effectuate a shut down.

Yet another object of the present invention is to provide a disabling system wherein a query, command, and command receipt are key-coded using a continuously changing key.

Another object of the present invention is to provide a command generator in communication with a global positioning satellite and a target vehicle receiver, whereby the command generator conveys a command shutdown message via the satellite to the vehicle receiver.

Yet another object of the present invention is to provide a communication link interfacing relevant vehicle theft information as well as monitored vehicle locations as transmitted by the global positioning satellite with the disabling system.

These and other objects of the present invention will become apparent throughout the description which now follows.

SUMMARY OF THE INVENTION

The present invention is a vehicle disabling system for terminating operation of a vehicle. The system comprises, first of all, a transmit unit for transmitting a command shutdown message. The transmit unit here defined is a command generator in communication with a global positioning satellite whereby the command generator conveys a command shutdown message via the satellite to a target vehicle. Second, the system comprises a command-receiver vehicle unit in two-way communication with the transmit unit via the global positioning satellite and such that a shutdown message from the transmit unit can reach the vehicle unit. The vehicle unit is in communication with at least one operational component of the vehicle and capable of shutting down that component upon receipt of a shutdown message from the transmit unit to thereby terminate vehicle operation.

Preferably, the transmit unit initially transmits a query message prior to any shutdown message to confirm potentially accessible vehicle information. The vehicle unit is capable of receiving both the query message and the shutdown message and of responding to the query message. When the query response is an expected response, the vehicle unit can substantially immediately react to the shutdown message and accomplish shutdown of the operational component with which it is in communication. In one embodiment, the system can include database access to information about each particular vehicle and/or vehicle owner with respect to registered ownership, insurance coverage, outstanding judicial actions, etc., etc., all accessible as a result of vehicle unit response to the transmit unit query. Such query response can range simply from the vehicle identification number which is thereafter correlated via computer link with stored vehicle information, to a programmable data base within the vehicle unit which can be remotely changed as by telephone input using the standard communication microburst system to provide a direct response.

The query message and the shutdown message of the transmit unit and the query message response of the vehicle unit preferably are encoded with a continuously changing key determined by time of day and an algorithm common to both units. Both the transmit unit and the vehicle unit preferably are in a separate record-keeping communication with the global positioning satellite. In particular, with respect to the transmit unit, such satellite record-keeping communication functions to record all transmit unit usage and transmit this information to a monitor station to thereby maintain and assure proper and appropriate operator use of the transmit unit. With respect to the vehicle unit, such record-keeping satellite communication functions to receive location information of the vehicle both for apprehension purposes and for stolen-vehicle recovery purposes. In addition to having the operational components in communication with the vehicle unit for disabling of an already-operating vehicle, the operational components can also be in communication with a keyed ignition switch of the vehicle. In that instance, conventional computer circuitry including a computer chip on the key would shut down the operational components when the key is absent to thereby provide anti-theft functionality.

As is apparent, the disabling system of the present invention provides a safe and efficient manner for law enforcement personnel to apprehend criminals attempting vehicular escape to avoid capture. The system can be incorporated in new vehicles during their production, or it can be retrofitted to vehicles now in operation. Use of the system can ensure reduced risk and danger to innocent third parties as well as to law enforcement personnel by essentially eliminating the need for vehicle chases.

BRIEF DESCRIPTION OF THE DRAWINGS

An illustrative and presently preferred embodiment of the invention is shown in the accompanying drawings in which.

DETAILED DESCRIPTION OF THE PREFERRED EMBODIMENT

Figure 1:
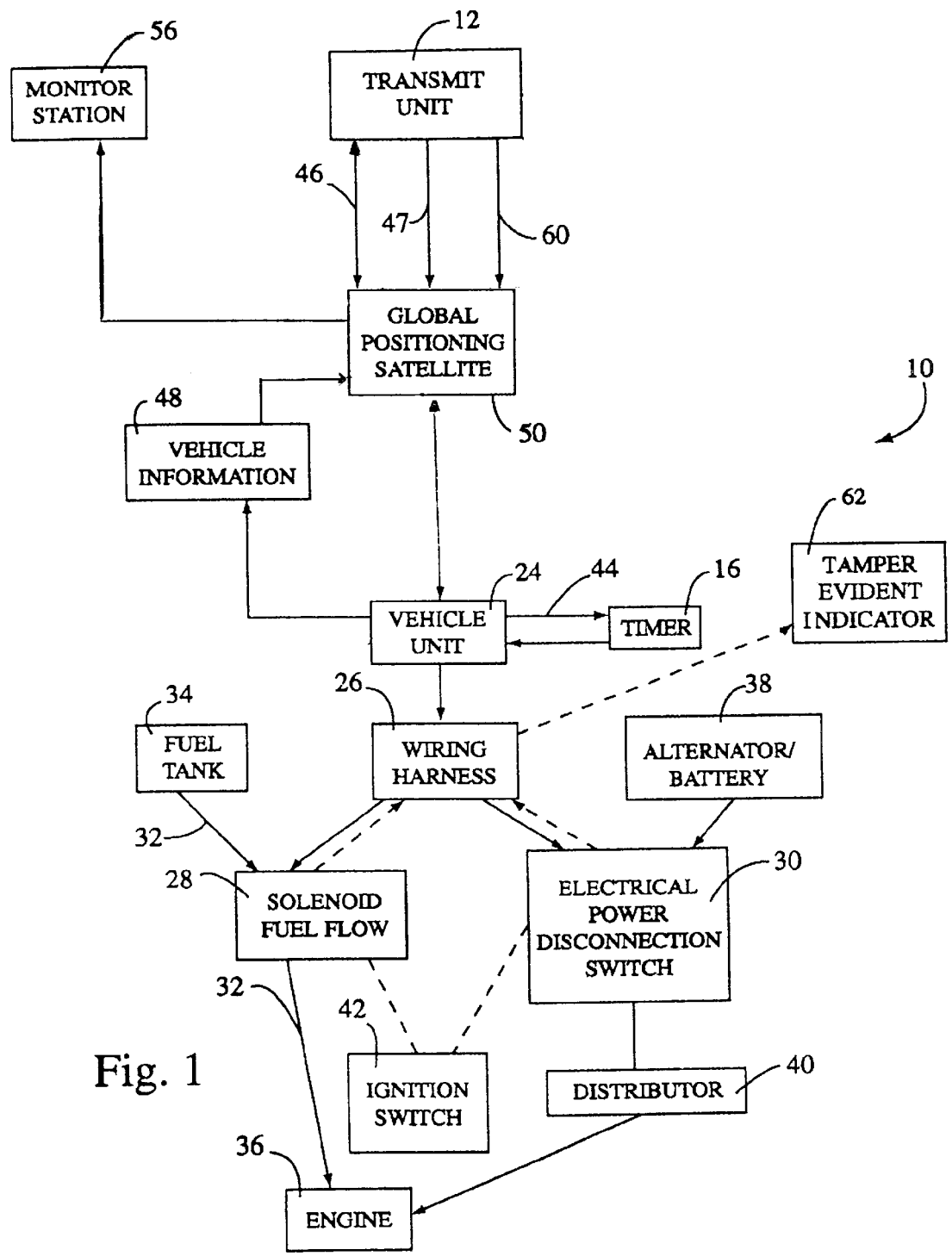
FIG. 1 is a flow diagram of a vehicle disabling system employing a global positioning satellite for terminating operation of a vehicle.

FIG. 1 illustrates a vehicle disabling system 10 operable through a global positioning satellite 50. In particular, the system 10 has a communication transmit unit 12 in communication with the satellite 50 for transmitting a command shutdown message. The satellite 50 receives the message and conventionally relays it to a command-receiver vehicle unit 24 disposed within the vehicle and preferably relatively hidden or otherwise not easily accessible to thereby deter attempted tampering. The vehicle unit 24 is in communication via a wiring harness 26 with both a closable solenoid fuel flow valve 28 and an electrical power disconnection switch 30, both as known in the art. The valve 28 is situated in a fuel line 32 leading from a fuel tank 34 to the vehicle engine 36, and can have a reset button located someplace within the vehicle such as in the trunk compartment. The vehicle unit 24 preferably has an integral reset circuit 44 leading to a conventional timer 16 to thereby automatically reset and thus deactivate shutdown after a preset time as, for example, 20 minutes. The power disconnection switch 30 is disposed between the power source 38, generally an alternator and battery, and a conventional distributor 40 found in most engines. While the preferred embodiment includes a connection from the vehicle unit 24 to both a fuel flow valve 28 and a power disconnection switch 30, it is not necessary to have or include both of these operational components. Instead, only one or the other of the valve 28 and switch 30 can be in communication with the vehicle unit 24. Further, in a retrofit situation where a vehicle owner wishes to add the disabling system, addition of a fuel flow valve 28 is relatively easily performed. A tamper-evident indicator 62 can be provided in communication with the valve 28 and switch 30 via the harness 26. The indicator 62 can be, for example, a white or colored light on the exterior of the vehicle, and could even be a pre-existing back-up light, that remains illuminated to thereby draw attention to an unusual event. If attempted or actual disengagement of the valve 28 or switch 30 occurs, the indicator is permanently activated to thereby alert passers-by as well as law enforcement personnel of the presence of tampering and a probable security breach. In addition to being in communication with the vehicle unit 24, the valve 28 and switch 30 can be in communication with the keyed ignition switch 42 of the vehicle. A key (not shown) having a computer chip therewith is provided to complete a circuit as known in the art such that absence of a key results in a shut down of both the valve 28 and switch 30. When such communication is provided, the disabling system 10 additionally functions as an anti-theft system. The vehicle security system can additionally include a keyless entry system whereby a handheld transmitter device can have a plurality of functions. In particular, and in addition to unlocking one or more vehicle doors, the device can be equipped with a panic button which can activate a global positioning satellite communication initiated from within the vehicle when a user is near the vehicle but unable to reach the vehicle. Such communication can alert law enforcement personnel that the user apparently is experiencing an emergency and thus dispatch help to the vehicle location in order to aid the user. Additionally, the device can function as a remote activator of the on-board computer within the vehicle to thereby further enhance vehicle security by prohibiting vehicle operability without proper computer recognition and response to a recognized signal. Should a vehicle be stolen, such information can likewise be transmitted via the global positioning satellite to the on-board computer which, in turn, can be linked with an external theft advisement such as continuously flashing red lights on the vehicle to thereby alert law enforcement officials that the vehicle is stolen.

The transmit unit 12 and vehicle unit 24 can be provided with standard handshake encoding. In particular, the encoding system is constructed with circuitry as known in the art to provide a continuously changing coded key common to both the transmit unit 12 and the vehicle unit 24. This code can be determined by time of day and an algorithm substantially identically operable in both the transmit unit 12 and the vehicle unit 24, with the time of day acceptable range being plus or minus one hour to thereby compensate for expected non-exact time settings. The transmit unit 12 transmits via the satellite 50 an encoded query message 46 to which the vehicle unit 24 responds with an encoded stream of vehicle identification information 48 which can include the vehicle identification number, vehicle owner identity, and the like. Depending upon the degree of present technology incorporated into the vehicle unit 24, the unit 24 can additionally relate earlier-loaded information, which can be remotely loaded by telephone connection thereto, concerning insurance coverage, previous vehicle-owner offenses, and the like. This information can be transmitted from the vehicle unit 24 within which it is stored via the satellite 50 to the transmit unit 12. Upon receipt of the transmitted information, the operator of the transmit unit 12 can send via the satellite 50 a shutdown message 47 to the vehicle unit 24 as appropriate. Message transmission from the transmit unit 12 is vehicle specific, meaning that one transmit-unit activation can disable only one vehicle as opposed to a plurality of vehicles at once. Thus, a separate activation is required for each disablement. On the unlikely chance that an incorrect vehicle is accidently disabled, the transmit unit 12 is provided with the capability to transmit a reset message 60 to the vehicle unit 24 of such incorrect vehicle to thereby re-establish vehicle operation.

The vehicle disabling system 10 additionally includes record keeping through the global positioning satellite 50 leading to a monitor station 56. With respect to the transmit unit 12, such satellite communication functions to record all transmit unit usage and send this information to the monitor station 56 to thereby maintain and assure proper and appropriate operator use of the transmit unit 12. With respect to the vehicle unit 24, such satellite communication functions to receive and convey location information of the vehicle both for apprehension purposes and for stolen-vehicle recovery purposes.

Operability of the vehicle disabling system 10 is initiated when an operator activates the transmit unit 12 to thereby first deliver a query message via the satellite 50 to the vehicle unit 24 of a subject vehicle and establishes a handshake there between. Depending upon the response message delivered via the satellite 50 from the vehicle unit 24 and the purpose of the query, the operator has a choice of proceeding no further (e.g. if ownership, insurance information, etc. is proper and no other action is indicated), or of sending a shutdown message and disabling the vehicle as described above.

As is thus apparent, the present invention provides a vehicle apprehension and recovery method that is effective without requiring substantial risk because of high speed or otherwise dangerous vehicular pursuits. Benefits inherent in the invention therefore include safety for persons in the proximity of an apprehension site, property preservation since destructive activity caused by speeding vehicles is precluded, and return of stolen vehicles to rightful owners without high repair expenses which are reflected in insurance costs. While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A vehicle disabling system for terminating operation of a vehicle, the system comprising:
    a) a transmit unit for transmitting a command shutdown message, said transmit unit in communication with a global positioning satellite for transmitting a command shutdown message via said satellite; and
    b) a vehicle unit for receiving the shutdown message, with said vehicle unit being in communication with at least one operational component of the vehicle for shutting down said component upon receipt of the shutdown message from the transmit unit via the satellite for terminating vehicle operation, said operation component being in communication with a visually observable tamper-evident indicator disposed at an external site of the vehicle whereby tampering with the operational component activates the indicator for drawing attention to the vehicle while concealing activation of said indicator from an occupant of the vehicle.

2. A vehicle disabling system as claimed in claim 1 wherein the transmit unit thereof additionally comprises a reset message transmittable via the satellite to the vehicle unit for reversal of a pre-transmitted shutdown message.

3. A vehicle disabling system as claimed in claim 1 wherein the system additionally comprises a communication linkage via the satellite between the vehicle unit and a monitor station for sending a usage record of the transmit unit to said monitor station.

4. A vehicle disabling system as claimed in claim 1 wherein transmissions and responses between the transmit unit and the vehicle unit via the satellite are encoded with a continuously changing key determined by time of day and an algorithm common to the query message, shutdown message and query message response.

5. A vehicle disabling system for terminating operation of a vehicle, the system comprising:
    a) a transmit unit in communication with a global positioning satellite for transmitting via the satellite a query message and a shutdown message and for receiving via the satellite a response to the query message; and
    b) a vehicle unit for receiving the query message and the shutdown message and for providing via the satellite a query message response activated and generated by the vehicle unit, with said vehicle unit being in communication with at least one operational component of the vehicle for shutting down said component upon receipt of a shutdown message from the transmit unit to thereby terminate vehicle operation, said operation component being in communication with a visually observable tamper-evident indicator disposed at an external site of the vehicle whereby tampering with the operational component activates the indicator for drawing attention to the vehicle while concealing activation of said indicator from an occupant of the vehicle.

6. A vehicle disabling system as claimed in claim 5 wherein the transmit unit thereof additionally comprises a reset message transmittable via the satellite to the vehicle unit for reversal of a pre-transmitted shutdown message.

7. A vehicle disabling system as claimed in claim 5 wherein the system additionally comprises a communication linkage via the satellite for sending a usage record of the transmit unit and a remote receiver in communication with the satellite for receiving said usage record.

8. A vehicle disabling system as claimed in claim 5 wherein transmissions and responses between the transmit unit and the vehicle unit are encoded with a continuously changing key determined by time of day and an algorithm common to the query message, shutdown message and query message response.

9. A vehicle disabling system for terminating operation of a vehicle, the system comprising:
    a) a transmit unit for transmitting a command shutdown message, said transmit unit in communication with a global positioning satellite for transmitting a command shutdown message via said satellite;
    b) a vehicle unit for receiving the shutdown message, with said vehicle unit being in communication with at least one operational component of the vehicle for shutting down said component upon receipt of the shutdown message from the transmit unit via the satellite for terminating vehicle operation; and
    c) a communication linkage via the satellite between the vehicle unit and a monitor station for sending a usage record of the transmit unit to said monitor station.

10. A vehicle disabling system for terminating operation of a vehicle, the system comprising:
    a) a transmit unit in communication with a global positioning satellite for transmitting via the satellite a query message and a shutdown message and for receiving via the satellite a response to the query message;
    b) a vehicle unit for receiving the query message and the shutdown message and for providing via the satellite a query message response activated and generated by the vehicle unit, with said vehicle unit being in communication with at least one operational component of the vehicle for shutting down said component upon receipt of a shutdown message from the transmit unit to thereby terminate vehicle operation; and
    c) a communication linkage via the satellite for sending a usage record of the transmit unit and a remote receiver in communication with the satellite for receiving said usage record.

* * * * *